US010192328B2

United States Patent
Zamyatin et al.

(10) Patent No.: US 10,192,328 B2
(45) Date of Patent: Jan. 29, 2019

(54) METHOD FOR STATISTICAL WEIGHTS DESIGN IN ITERATIVE RECONSTRUCTION ALGORITHMS

(71) Applicant: Toshiba Medical Systems Corporation, Otawara-shi (JP)

(72) Inventors: Alexander A. Zamyatin, Hawthorn Woods, IL (US); Daxin Shi, Buffalo Grove, IL (US); Thomas Labno, Palatine, IL (US)

(73) Assignee: Toshiba Medical Systems Corporation, Otawara-shi (JP)

( * ) Notice: Subject to any disclaimer, the term of this patent is extended or adjusted under 35 U.S.C. 154(b) by 841 days.

(21) Appl. No.: 14/062,601

(22) Filed: Oct. 24, 2013

(65) Prior Publication Data

US 2015/0117732 A1 Apr. 30, 2015

(51) Int. Cl.
*G06T 11/00* (2006.01)

(52) U.S. Cl.
CPC .......... *G06T 11/003* (2013.01); *G06T 11/006* (2013.01); *G06T 2211/424* (2013.01)

(58) Field of Classification Search
CPC . G06T 11/003; G06T 2211/424; G06T 11/006
USPC ........................................................ 382/131
See application file for complete search history.

(56) References Cited

U.S. PATENT DOCUMENTS

| 2006/0067573 | A1* | 3/2006 | Parr | G06K 9/00275 |
| | | | | 382/154 |
| 2012/0219200 | A1* | 8/2012 | Reeves | G06T 7/0012 |
| | | | | 382/131 |
| 2013/0101190 | A1* | 4/2013 | Shi | G06T 11/006 |
| | | | | 382/131 |
| 2013/0121553 | A1* | 5/2013 | Thibault | G06T 11/005 |
| | | | | 382/131 |

FOREIGN PATENT DOCUMENTS

JP 2013-85960 A 5/2013

OTHER PUBLICATIONS

Extended European Search Report dated Mar. 23, 2015 in Patent Application No. 14190175.1.
Daxin Shi, et al., "Weighted Simultaneous Algebraic Reconstruction Technique" 11th International Meeting on Fully Three-Dimensional Image Reconstruction in Radiology and Nuclear Medicine, XP55175961A, Jul. 11, 2011, pp. 160-162.

(Continued)

*Primary Examiner* — Amandeep Saini
(74) *Attorney, Agent, or Firm* — Oblon, McClelland, Maier & Neustadt, L.L.P.

(57) ABSTRACT

A method of computing statistical weights for a computed tomography (CT) iterative reconstruction process is provided. The method includes obtaining detector count data from a CT scan of an object; calculating variance data based on the count data and an electronic noise variance; transforming the calculated variance data to obtain statistical weight data; and performing the CT iterative reconstruction process using the statistical weight data and raw projection data to obtain a reconstructed CT image.

16 Claims, 9 Drawing Sheets

(56) References Cited

OTHER PUBLICATIONS

Zhi Yang, et al., "Effective Data-domain Noise and Streak Reduction for X-Ray CT" 11$^{th}$ International Meeting on Fully Three-Dimensional Image Reconstruction in Radiology and Nuclear Medicine, XP55175966A, Jul. 11, 2011, pp. 290-293.

Office Action dated Jun. 26, 2018, in corresponding Japanese Patent Application No. 2014-191820, citing document AO therein. 17 pages.

* cited by examiner

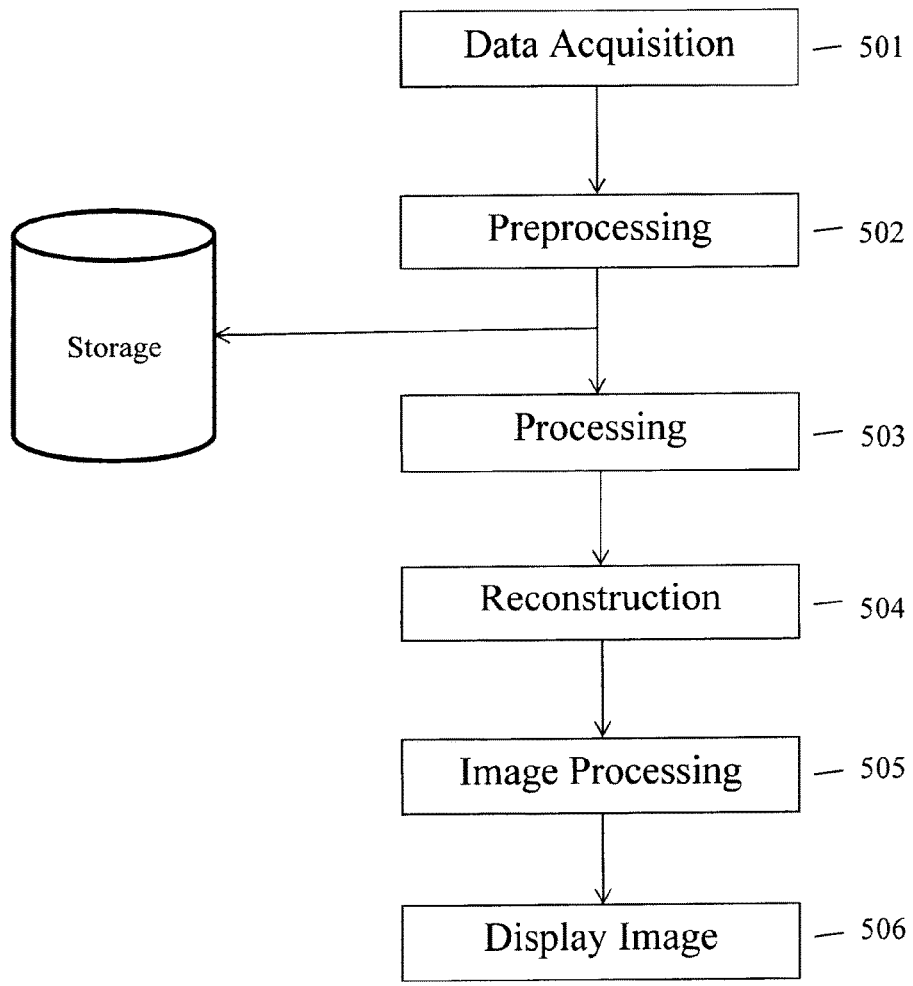
FIG. 5
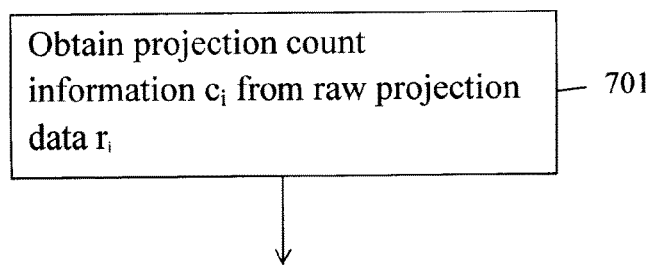

METHOD FOR STATISTICAL WEIGHTS DESIGN IN ITERATIVE RECONSTRUCTION ALGORITHMS

FIELD

The exemplary implementations described herein relate to iterative reconstruction algorithms in computed tomography (CT) systems.

BACKGROUND

X-ray tomographic imaging, in its simplest expression, is an X-ray beam traversing an object, and a detector relating the overall attenuation per ray. The attenuation is derived from a comparison of the same ray with and without the presence of the object. From this conceptual definition, several steps are required to properly construct/reconstruct an image. For instance, the finite size of the X-ray generator, the nature and shape of the filter blocking the very low energy X-rays from the generator, the details of the geometry and characteristics of the detector, and the capacity of the acquisition system are all elements that affect how reconstruction is performed.

In one of many possible geometries, an X-ray source on top of the graph shown in FIG. 1 is emitting an X-ray beam forming a fan or cone, traversing the object. While a wide range of values can exist, typically, the distance "C" is around 100 cm, "B" is around 60 cm, and "A" is around 40 cm. In tomography, each point of the object can be traversed by a collection of rays covering at least 180 degrees. Thus, the entire X-ray generator and detector assembly can rotate around the patient. Mathematical considerations show that tomographic conditions are met when a scan of 180 degrees plus a fan angle is performed.

Statistical weighting is an important component in CT iterative reconstruction algorithms. In conventional systems, it is generally believed that the statistical weighting scheme should be the count information recorded by the detector, which is governed by a Poisson stochastic process, e.g., directly using count information as weights. However, as shown in FIGS. 2A (filtered back-projection) and 2B (iterative reconstruction), due to strong count weighting, reconstructed images suffer from artifacts and have poor image quality.

BRIEF DESCRIPTION OF THE DRAWINGS

A more complete appreciation of the disclosed embodiments and many of the attendant advantages thereof will be readily obtained as the same becomes better understood by reference to the following detailed description when considered in connection with the accompanying drawings, wherein:

FIG. 5 is a flowchart of an exemplary CT reconstruction process;

DETAILED DESCRIPTION

Figure 1:
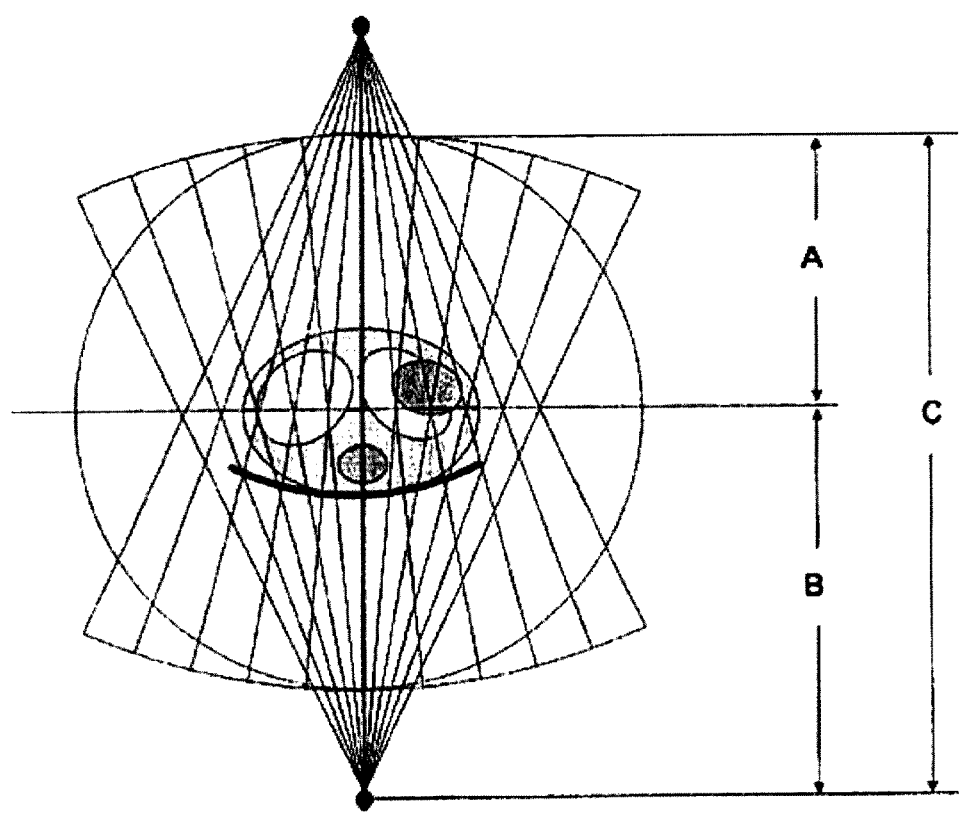
FIG. 1 illustrates an X-ray source emitting an X-ray beam forming a fan or cone, traversing an object.
Figures 2A, 2B:
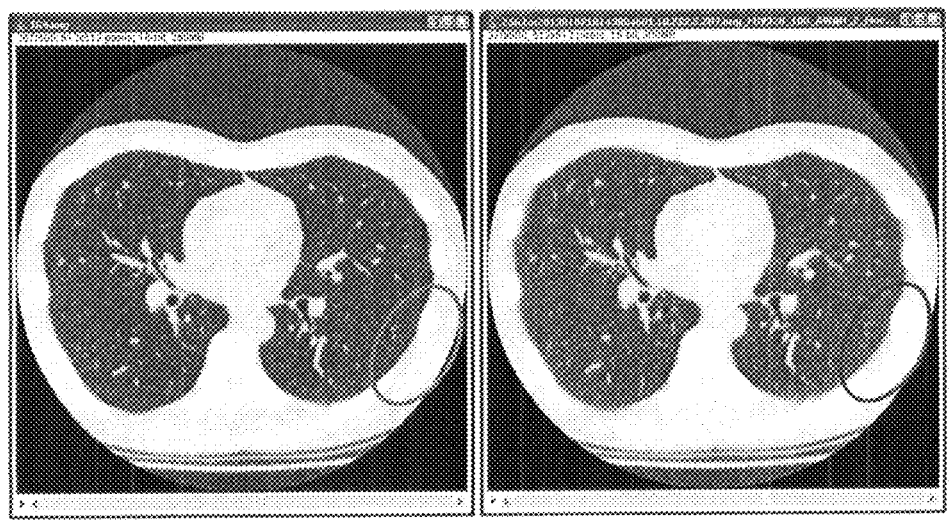
FIGS. 2A and 2B illustrate image artifacts in iterative reconstruction.

According to one embodiment, there is provided a method of computing statistical weights for a computed tomography (CT) iterative reconstruction process, the method comprising: (1) obtaining detector count data from a CT scan of an object; (2) calculating variance data based on the count data and an electronic noise variance; (3) transforming the calculated variance data to obtain statistical weight data; and (4) performing the CT iterative reconstruction process using the statistical weight data and raw projection data to obtain a reconstructed CT image.

In one embodiment, the calculating step comprises calculating the variance data as $$v = \frac{m + v_e}{m \times m},$$

wherein m is the mean count data and $v_e$ is the electronic noise variance.

In one embodiment, the transforming step comprises: (1) applying a low-pass filter to the variance data; and (2) applying a range-compressing function to the variance data to obtain the statistical weight data. In some embodiments, the range-compressing function is a logarithm function or a square root function.

In one embodiment, the transforming step comprises: (1) applying a threshold function to the variance data to obtained threshold data; and (2) applying a low-pass filter to the threshold data to obtain the statistical weight data. In one embodiment, the threshold function transforms input values to an output range between first and second predetermined values.

In another embodiment, the transforming step comprises: (1) applying a threshold function to the variance data to obtained threshold data; (2) applying a low-pass filter to the threshold data to obtain filtered threshold data; and (3) applying a range-compressing function to the filtered threshold data to obtain the statistical weight data. In one embodiment, the second threshold function transforms input values to an output range of less than a predetermined threshold value.

In another embodiment, the obtaining step comprises obtaining the detector count data from the raw projection data.

Various methods, systems, devices, and computer-readable medium can be implemented in accordance with this disclosure.

In the drawings, like reference numerals designate identical or corresponding parts throughout the several views. Further, as used herein, the words "a," "an" and the like generally carry a meaning of "one or more," unless stated otherwise.

Figure 3:
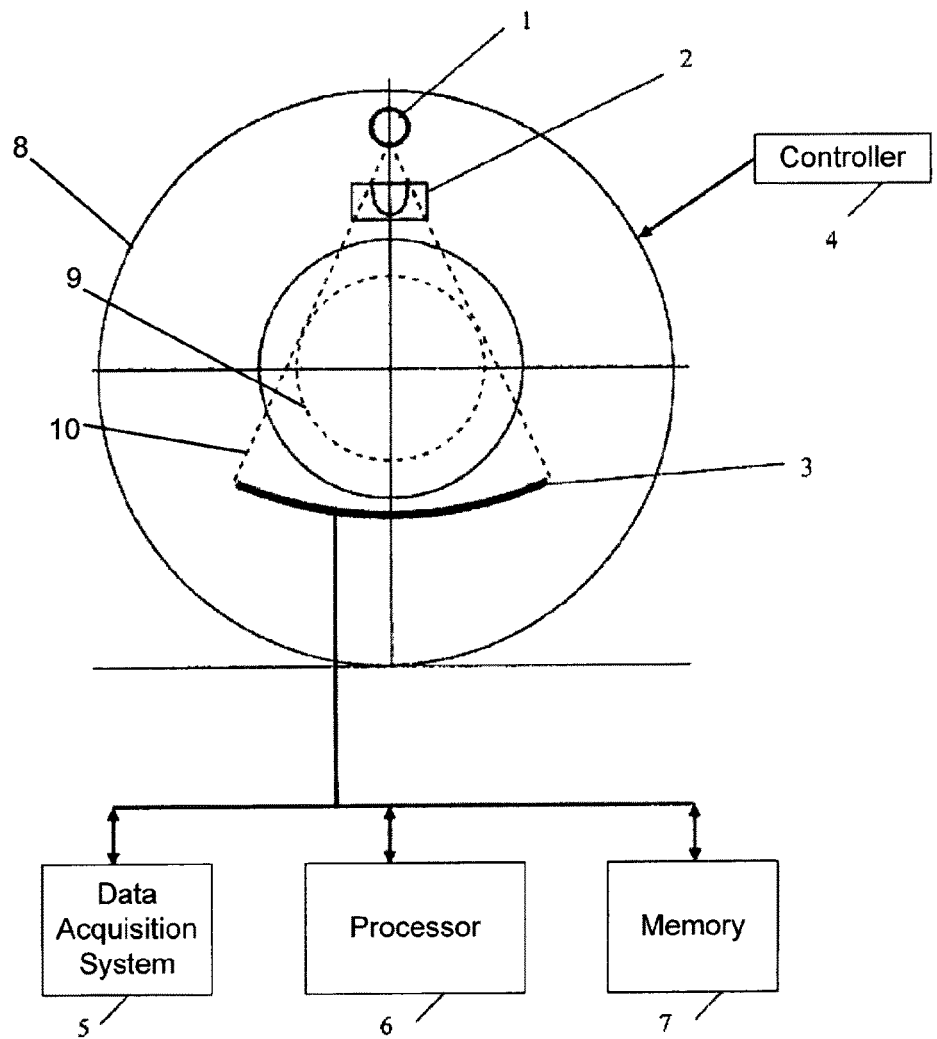
FIG. 3 is a schematic diagram of a mechanically simplified CT apparatus.

FIG. 3 illustrates a simplified schematic structure of a CT apparatus that can include a detector array to detect photons. Aspects of this disclosure are not restricted to a CT apparatus as the medical imaging system. In particular, the structures and procedures described herein can be applied to other medical imaging systems, and the descriptions provided herein specifically relating to a CT apparatus and the detection of photons should be considered as exemplary.

A detector array, a photon detector and/or a photon detector array may be referred to herein merely as a detector. The CT apparatus illustrated in FIG. 3 includes an X-ray tube 1, filters and collimators 2, and a detector 3. The CT apparatus also includes additional mechanical and electrical components such as a gantry motor and a controller 4 to control the rotation of the gantry, control the X-ray source, and control a patient bed. The CT apparatus also includes a data acquisition system 5 and a processor 6 to generate CT images based on the projection data acquired by the data acquisition system. The processor and data acquisition system can make use of a memory 7, which is configured to store, e.g., data obtained from the detector and reconstructed images.

The X-ray tube 1, filters and collimators 2, detector 3 and controller 4 can be provided in a frame 8 that includes a bore. The frame 8 has a general cylindrical or donut shape. In the view shown in FIG. 3, a longitudinal axis of the bore of the frame 8 is in the center of the bore, and extends into and out of the page. An interior of the bore, identified as area 9, is a target area for imaging. An object to be scanned, such as a patient, is placed in the target area with, e.g., a patient table. The object can then be irradiated by the X-ray tube 1 with a fan or cone of radiation 10, which generally, substantially or effectively cross-sects the object with respect to the longitudinal axis. The data acquisition system 5 captures intensity of incident X-ray photons on the detector 3 and transmits it to the processor 6. The data acquisition system 5, the processor 6, and the memory 7 can be implemented as a single machine or computer, or as separate machines or computers that are coupled together via a network or other data communication system. The controller 4 can also be coupled via the network or other data communication system, and can be implemented by a separate machine or computer, or as part of another machine or computer of the system.

In FIG. 3, the detector 3 is a rotational detector array that rotates with the X-ray tube 1 with respect to the longitudinal axis. As discussed below, but not shown in FIG. 3, a stationary detector array can also be included, thus providing a rotating detector array and a stationary array, together, in the frame 8. Other detectors can be implemented.

Figure 4:
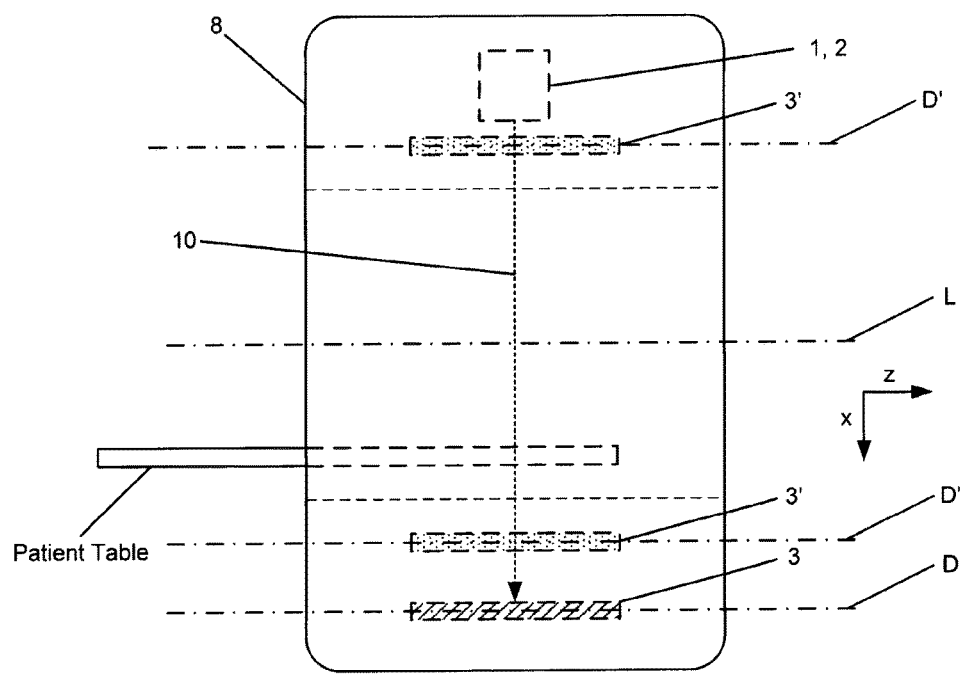
FIG. 4 is a schematic diagram of a mechanically simplified CT apparatus with a detector extending in a direction of a longitudinal axis.

FIG. 4 is a schematic diagram of a mechanically simplified CT apparatus with a detector extending in a direction of a longitudinal axis. FIG. 4 is a side view of the CT apparatus shown in FIG. 3, illustrating a rotating detector array and a stationary array, together, in the frame 8. In particular, FIG. 3 is a view of a CT apparatus from the perspective of a longitudinal axis L, where this axis extends into and out of the page. In FIG. 4, the longitudinal axis L extends side-to-side across the page.

FIG. 4 illustrates a rotating detector 3 as having a detector axis D as also extending side-to-side across the page. D is generally, substantially or effectively parallel to L. That is, the relationship between these two axes is parallel within a margin of a 2°, 1°, or less. According to the various aspects described herein, a perfect geometrically "parallel" or "perpendicular" relationship is not generally necessary, and a "general, substantial or effective" relationship is suitable within a margin of 2°, 1°, or less.

The rotating detector 3 can rotate together with the X-ray tube 1 about the longitudinal axis L. A series of stationary detector arrays 3' can be provided, in a periodic or irregular fashion, around the frame 8, and can form a circular shape when viewed along the longitudinal axis L.

The series of stationary detector arrays 3' can be provided along respective detector axes D', which extend side-to-side across the page. D' is generally, substantially or effectively parallel to L and D. That is, the relationship between these axes is parallel within a margin of a 2°, 1°, or less. According to the various aspects described herein, a perfect geometrically "parallel" or "perpendicular" relationship is not generally necessary, and a "general, substantial or effective" relationship is suitable within a margin of 2°, 1°, or less.

FIG. 4 also illustrates a patient table extending into the bore of the frame 8, and the fan or cone 10. The fan or cone 10 has a major length in the side-to-side dimension in the view of FIG. 3, and a minor length in the side-to-side dimension in the view of FIG. 4. In exemplary implementations, the fan or cone 10 can impinge upon both the detector array 3 and one of the detector arrays 3'. Further, although FIG. 4 illustrates the detector array 3 and the detector arrays 3' as having a common dimensional length in the z-direction, other implementations include varying lengths in the z-direction between the detector array 3 and the detector arrays 3' or amongst the detector arrays 3'.

Figure 6:
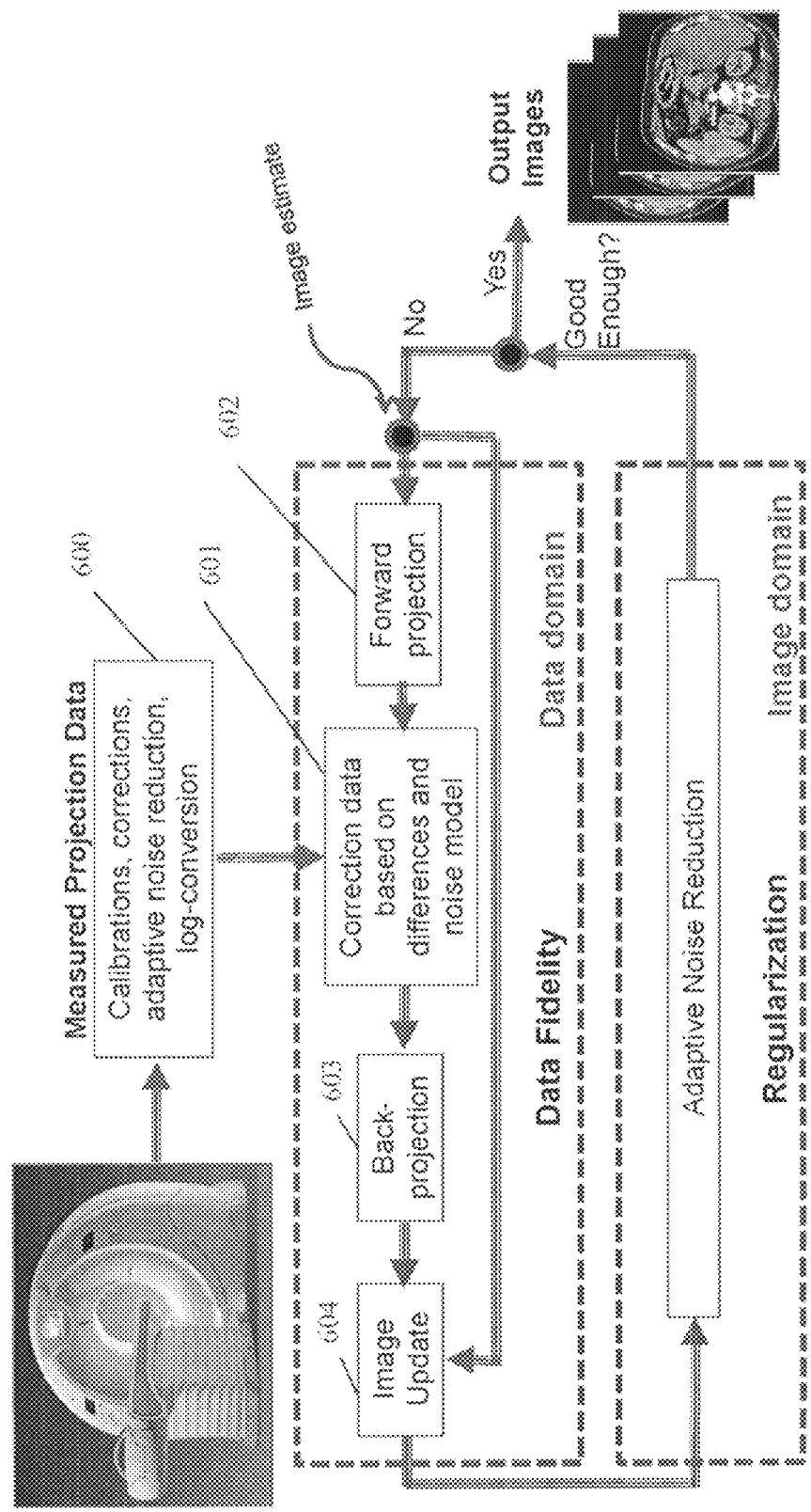
FIG. 6 is a flowchart of an iterative reconstruction process.

FIG. 5 illustrates the basic steps in CT image reconstruction, including data acquisition 501, preprocessing 502, processing 503, reconstruction 504, image processing 505, and image display 506. Data acquisition 501 includes obtaining data from the detectors in a stationary domain. Preprocessing 502 includes data decoding, offset correction, normalization, calibration, and log-conversion. The preprocessed data is stored in a memory prior to processing step 503. Processing step 503 can include bad channel correction, scatter-correction, and adaptive noise reduction. Other calibrations and corrections to the data can be performed in the preprocessing and processing steps shown in FIG. 5, and the order of the specific steps performed can vary. Further, some of the mentioned steps can be optional. The "raw" projection data output from processing 503 is used in the reconstruction process 504, which is also illustrated in FIG. 6. The images output by the reconstruction step 504 can be further processed in the image processing step 505 and displayed in step 506.

Aspects of this disclosure relate to a new method that transforms count information so as to modify weighting factors used in iterative reconstruction, i.e., in step 504. Based on this transformation, artifacts due to inaccurate count information are mitigated in the final reconstructed image.

Some new types of detectors capture photon count information directly, i.e., photon-counting detectors. In this case, count information is provided directly by the detector and transmitted to the processor by data acquisition system. Photon-counting data statistics are known to be closely described by the Poisson distribution. A more common type of detectors in diagnostic CT is the energy-integrating detector, which captures a measured intensity of the incident X-ray beam, which is a sum of energies of all photons hitting the detector element during the measurement time, i.e., the signal is proportional to the photon count weighted by photon energies. During data acquisition the signal is discretized, and a discrete value of the measurement is sent to the processor. For simplicity we also call this discrete signal a "count", which is known to follow a compound Poisson distribution. Herein, we call the input signal "count" regardless of whether it was obtained by a photon-counting or an energy-integrating detector.

FIG. 6 illustrates the data flow in an example iterative reconstruction process. In element 601, the difference $d_i$ is obtained as $d_i=(r_i-p_i)/v_i$ for each i=(view, row, column) combination of the projection data. Here $r_i$ is the raw projection data obtained from the processing performed in element 600, $p_i$ is obtained from the system model (forward projection 602), and $v_i$ is a statistical weight obtained from the noise model. Reconstruction, e.g., back-projection, is performed in element 603 and the image is updated in element 604, based on the previous image estimate. This process continues for a preset number of iterations or until a stopping criteria based on image quality is met.

Figure 7:
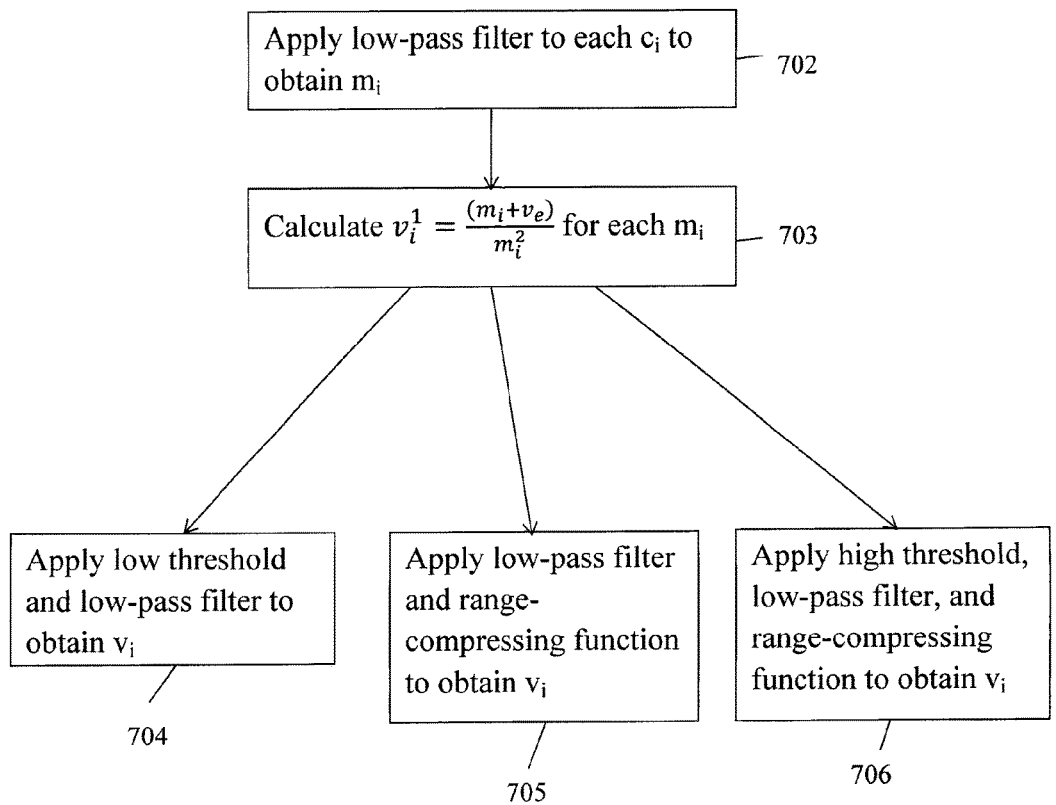
FIG. 7 is a flowchart of a noise model to calculate variance data.

The steps performed by the novel noise model, from which each statistical weight $v_i$ is obtained, are shown in FIG. 7.

In step 701, the count information $c_i$ is obtained from the raw projection data $r_i$. This processing includes, e.g., reversing the log and calibration processing steps, i.e., $c_i=\exp(R_i-C_i-r_i)$, where $R_i$ is the reference (normalization) value, and $C_i$ is the calibration value. Alternatively, the count information $c_i$ is stored after the pre-processing step 502 shown in FIG. 5 and need not be back-calculated in this step.

In step 702, a low pass-filter is applied to the count information to obtain $m_i$. A 3×3 window or a 5×7 window (or combinations thereof) is used in this step. Other size windows and various boundary conditions can be used to implement the filtering.

In step 703, a variance $v^1_i$ is computed from $m_i$ as $$v^1_i = \frac{m_i + \sigma_e}{m_i^2}$$

where $\sigma_e$ is the electronic noise variance, assuming a Gaussian noise distribution.

After step 704, $v_i$ can be computed in several different ways from $v^1_i$. As shown in FIG. 7, one of steps 704, 705, and 706 is performed following step 703.

For example, in step 704, a low-threshold function is applied to $v^1_i$ and then a low-pass filter (e.g., 5×7) is applied to obtain $v_i$. The limits on the low-threshold function are, in one embodiment, 0.1 and 1000. For example, values of $v^1_i$ below 0.1 are set to 0.1, while values of $v^1_i$ above 1000 are set to 1000. Other threshold values are possible. For example, the second threshold can vary between 100 and 10,000.

Alternatively, in step 705, a low-pass filter is applied to $v^1_i$ and then a range-compressing function is applied to the result. Preferred examples of the applied range-compressing function include the log function and the square-root function.

Alternatively, in step 706, a high threshold is applied to $v^1_i$, a low-pass filter is applied, and then a range-compressing function (e.g., log or sqrt) is applied. The limit on the high-threshold function is, in one embodiment, between 1000 and 10,000. For example, values of $v^1_i$ above the threshold value are set to the threshold value. Other threshold values are possible.

Figure 8A:
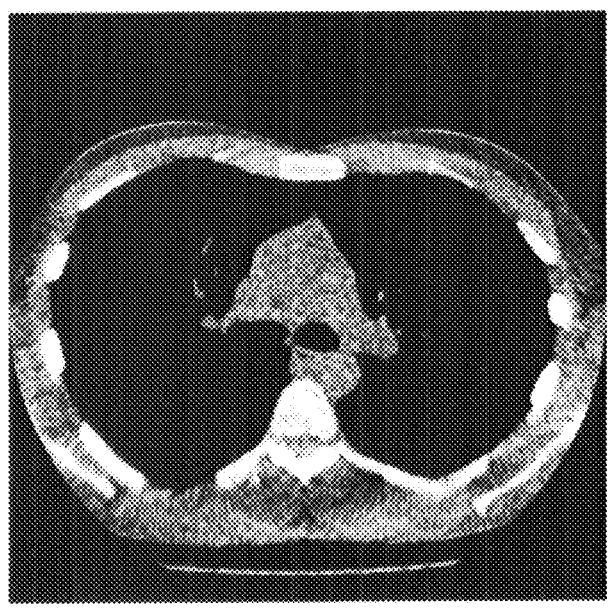
FIGS. 8A and 8B are reconstructed images using iterative reconstruction methods.
Figure 8B:
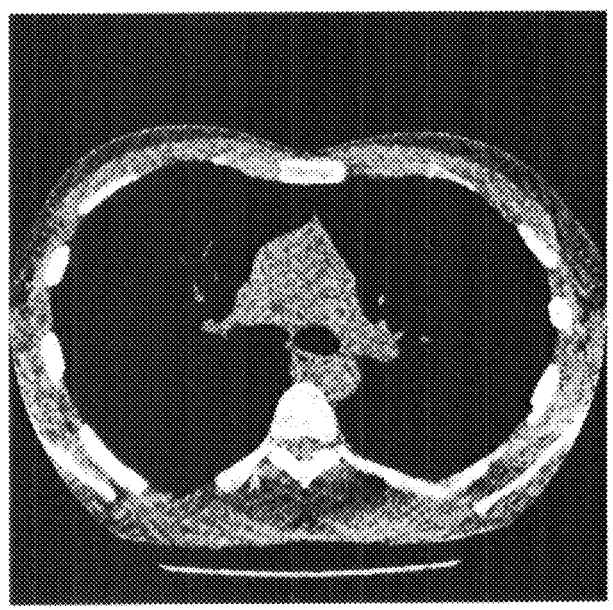

Example results of the novel method disclosed herein is illustrated in FIGS. 8A and 8B. FIG. 8A illustrates a reconstructed image obtained using a count-weighted iterative reconstruction algorithm. In contrast, FIG. 8B illustrates a reconstructed image, obtained using one of the reconstruction algorithms described above, in which image artifacts are mitigated compared to FIG. 8A.

Figure 9:
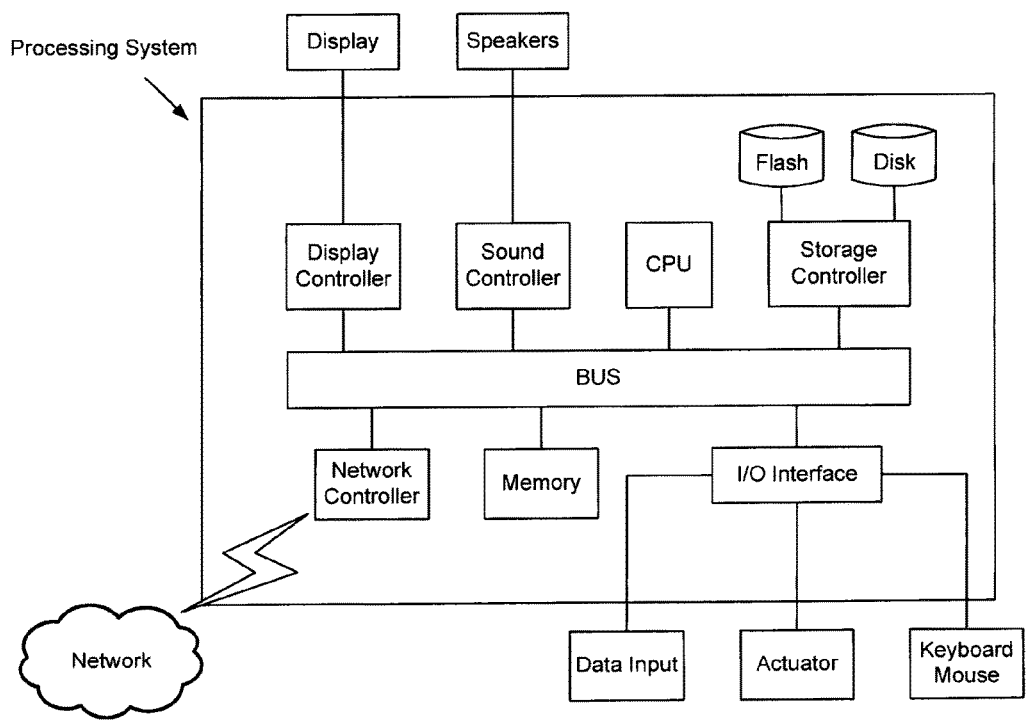
FIG. 9 is a schematic diagram of an exemplary processing system.

With reference to the structures illustrated in FIG. 3, an exemplary processing system is illustrated in FIG. 9. This exemplary processing system can be implemented using one or more microprocessors or the equivalent, such as a central processing unit (CPU) and/or at least one application specific processor ASP. The microprocessor is a hardware circuit that utilizes a computer readable storage medium, such as a memory circuit (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller, which can controls a hard disk drive or optical disk drive.

The microprocessor or aspects thereof, in alternate implementations, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU and a graphics processing unit (GPU) to achieve improved computational efficiency. One or more processors in a multi-processing arrangement may also be employed to execute sequences of instructions contained in memory. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed via a display controller to a monitor. The display controller preferably includes at least one graphic processing unit, which can be provided by a plurality of graphics processing cores, for improved computational efficiency. Additionally, an I/O (input/output) interface is provided for inputting signals and/or data from microphones, speakers, cameras, a mouse, a keyboard, a touch-based display or pad interface, etc., which can be connected to the I/O interface as a peripheral. For example, a keyboard or a pointing device for controlling parameters of the various processes or algorithms of this disclosure can be connected to the I/O interface to provide additional functionality and configuration options, or control display characteristics. Moreover, the monitor can be provided with a touch-sensitive interface for providing a command/instruction interface.

The above-noted components can be coupled to a network, such as the Internet or a local intranet, via a network interface for the transmission or reception of data, including controllable parameters. A central BUS is provided to connect the above hardware components together and provides at least one path for digital communication there between.

The data acquisition system 5, the processor 6 and the memory 7 of FIG. 3 can be implemented utilizing one or more processing systems in accordance with the exemplary implementation shown in FIG. 9. In particular, one or more circuits or computer hardware units coinciding with one or more of the devices illustrated in FIG. 9 can provide for the functions of the data acquisition system 5, the processor 6 and the memory 7. The functional processing described herein can also be implemented in one or more specialized circuits including circuits to perform the described processing. Such circuits can be a part of a computer processing system or a discrete device that is interconnected to other systems. A processor in accordance with this disclosure can also be programmed to or configured to execute the functional processing described herein by computer code elements.

Further, the processing systems, in one implementation, can be connected to each other by a network or other data communication connection. One or more of the processing systems can be connected to corresponding actuators to actuate and control movement of the gantry, the X-ray source, and/or the patient bed.

Suitable software can be tangibly stored on a computer readable medium of a processing system, including the memory and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes and complete executable programs. Moreover, parts of the processing of aspects of this disclosure may be distributed for better performance, reliability and/or cost.

The Data Input portion of the processing system accepts input signals from a detector or an array of detectors by, e.g., respective wired connections. A plurality of ASICs or other data processing components can be provided as forming the Data Input portion, or as providing input(s) to the Data Input portion. The ASICs can receive signals from, respectively, discrete detector arrays or segments (discrete portions) thereof. When an output signal from a detector is an analog signal, a filter circuit can be provided, together with an analog-to-digital converter for data recording and processing uses. Filtering can also be provided by digital filtering, without a discrete filter circuit for an analog signal. Alternatively, when the detector outputs a digital signal, digital filtering and/or data processing can be performed directly from the output of the detector.

While certain implementations have been described, these implementations have been presented by way of example only, and are not intended to limit the scope of this disclosure. The novel devices, systems and methods described herein may be embodied in a variety of other forms; furthermore, various omissions, substitutions, and changes in the form of the devices, systems and methods described herein may be made without departing from the spirit of this disclosure. The accompanying claims and their equivalents are intended to cover such forms or modifications as would fall within the scope and spirit of this disclosure.

The invention claimed is:

1. A method of computing statistical weights for a computed tomography (CT) iterative reconstruction process, the method comprising:
   obtaining detector count data from a CT scan of an object;
   calculating variance data based on the count data and an electronic noise variance;
   transforming the calculated variance data to obtain statistical weight data, wherein the transforming step includes, applying a low-pass filter to the variance data, and applying a range-compressing function to the filtered variance data to obtain the statistical weight data; and
   performing the CT iterative reconstruction process using the statistical weight data and raw projection data to obtain a reconstructed CT image.

2. The method of claim 1, wherein the calculating step comprises:
   calculating the variance data as $v=(m+\sigma_e)/(m\times m)$, wherein m is the count data and $\sigma_e$ is the electronic noise variance.

3. The method of claim 2, wherein the transforming step comprises:
   applying a threshold function to the variance data to obtain threshold data;
   applying a low-pass filter to the threshold data to obtain filtered threshold data; and
   applying the range-compressing function to the filtered threshold data to obtain the statistical weight data.

4. The method of claim 3, wherein the threshold function transforms input values to an output range of less than a predetermined threshold value.

5. The method of claim 1, wherein the range-compressing function is a logarithm function.

6. The method of claim 1, wherein the range-compressing function is a square root function.

7. The method of claim 1, wherein the obtaining step comprises obtaining the detector count data from the raw projection data.

8. A method of computing statistical weights for a computed tomography (CT) iterative reconstruction process, the method comprising:
   obtaining detector count data from a CT scan of an object;
   calculating variance data based on the count data and an electronic noise variance, wherein the calculating step includes calculating the variance data as $v=(m+\sigma_e)/(m\times m)$, wherein m is the count data and $\sigma_e$ is the electronic noise variance;
   transforming the calculated variance data to obtain statistical weight data; and
   performing the CT iterative reconstruction process using the statistical weight data and raw projection data to obtain a reconstructed CT image, wherein the transforming step comprises:
      applying a first threshold function to the variance data to obtain threshold data; and
      applying a low-pass filter to the threshold data to obtain the statistical weight data.

9. The method of claim 8, wherein the threshold function transforms input values to an output range between first and second predetermined values.

10. An apparatus for computing statistical weights for a computed tomography (CT) iterative reconstruction process, the apparatus comprising:
    a processing circuit configured to
       obtain detector count data from a CT scan of an object;
       calculate variance data based on the count data and an electronic noise variance;
       transform the calculated variance data to obtain statistical weight data, wherein the transforming step includes applying a low-pass filter to the variance data, and applying a range-compressing function to the filtered variance data to obtain the statistical weight data; and
       perform the CT iterative reconstruction process using the statistical weight data and raw projection data to obtain a reconstructed CT image.

11. The apparatus of claim 10, wherein the processing circuit is further configured to:

calculate the variance data as $v=(m+\sigma_e r)(m \times m)$, wherein m is the count data and $\sigma_e$ is the electronic noise variance.

12. The apparatus of claim 11, wherein the processing circuit is further configured to:
  apply a threshold function to the variance data to obtain threshold data;
  apply a low-pass filter to the threshold data to obtain filtered threshold data; and
  apply the range-compressing function to the filtered threshold data to obtain the statistical weight data.

13. The apparatus of claim 12, wherein the processing circuit is configured to apply the threshold function, which transforms input values to an output range of less than a predetermined threshold value.

14. The apparatus of claim 10, wherein the processing circuit is further configured to apply a logarithm function as the range-compressing function.

15. The apparatus of claim 10, wherein the processing circuit is configured to apply a square root function as the range-compressing function.

16. The apparatus of claim 10, wherein the processing circuit is further configured to obtain the detector count data from the raw projection data.

* * * * *